No. 734,393. PATENTED JULY 21, 1903.
M. ARNDT.
PYROMETER.
APPLICATION FILED NOV. 6, 1900.
NO MODEL. 3 SHEETS—SHEET 1.

Witnesses:
Inventor:
Max Arndt.

No. 734,393. PATENTED JULY 21, 1903.
M. ARNDT.
PYROMETER.
APPLICATION FILED NOV. 6, 1900.
NO MODEL. 3 SHEETS—SHEET 3.

Witnesses: Inventor:
Max Arndt.
By
Atty

No. 734,393. Patented July 21, 1903.

UNITED STATES PATENT OFFICE.

MAX ARNDT, OF AIX-LA-CHAPELLE, GERMANY.

PYROMETER.

SPECIFICATION forming part of Letters Patent No. 734,393, dated July 21, 1903.

Application filed November 6, 1900. Serial No. 35,684. (No model.)

*To all whom it may concern:*

Be it known that I, MAX ARNDT, a subject of the King of Prussia, German Emperor, residing at the city of Aix-la-Chapelle, in the Kingdom of Prussia, Germany, have invented a new and useful Improved Pyrometer, of which the following is a specification.

My invention relates to a pyrometer in which air inclosed in a vessel is heated by the temperature to be measured and in consequence of the pressure or expansion of the air thereby occurring in said vessel the temperature is indicated, the result of the measurement being, by means of a body movable within the vessel, transmitted from the space in which the temperature to be measured is present to the place where the measurement is to be indicated. The advantage thereby resulting consists in that the air inclosed in the vessel is directly influenced by the temperature to be measured, and this influence is carried over, for reading off the temperature direct, to a place lying outside the high-temperature sphere. Therefore, on the one hand, the use of air or gases for measuring the temperature of the gases is rendered practicable, and, on the other hand, the influence or action of these gases is by reason of the high temperature transmitted to another place. Further, the construction of my pyrometer is very simple.

Figure 1:
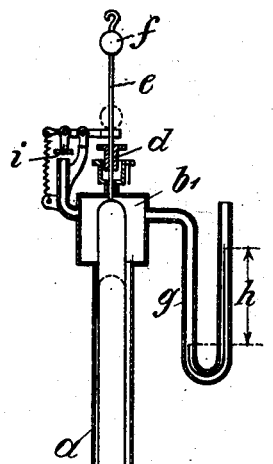
Figure 2:
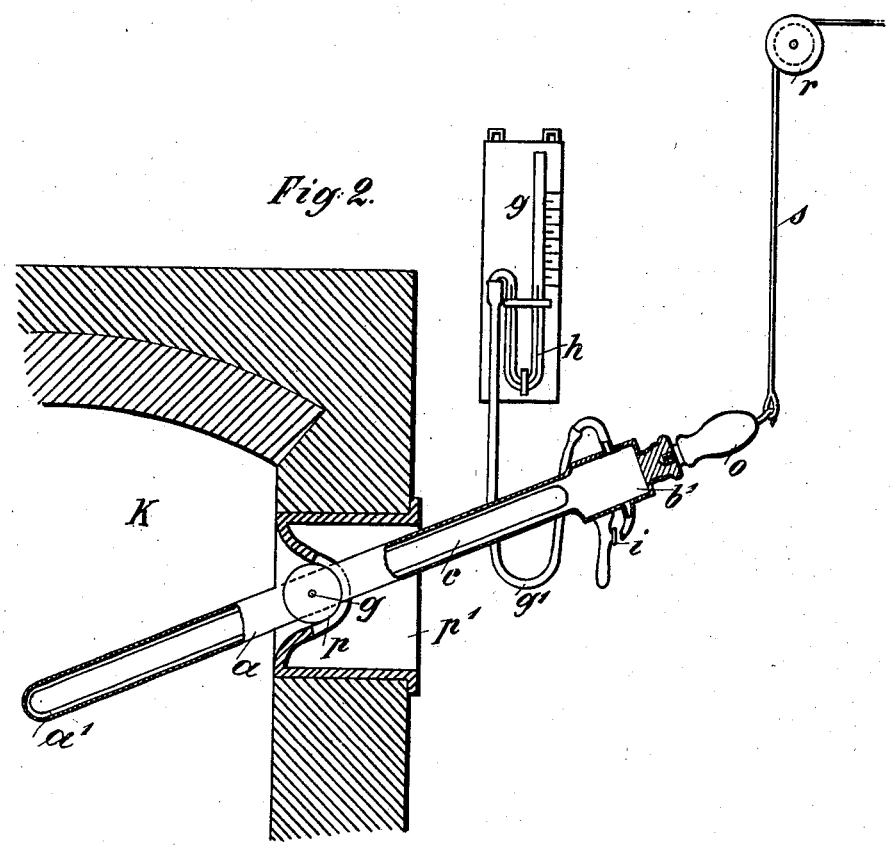
Figure 3:
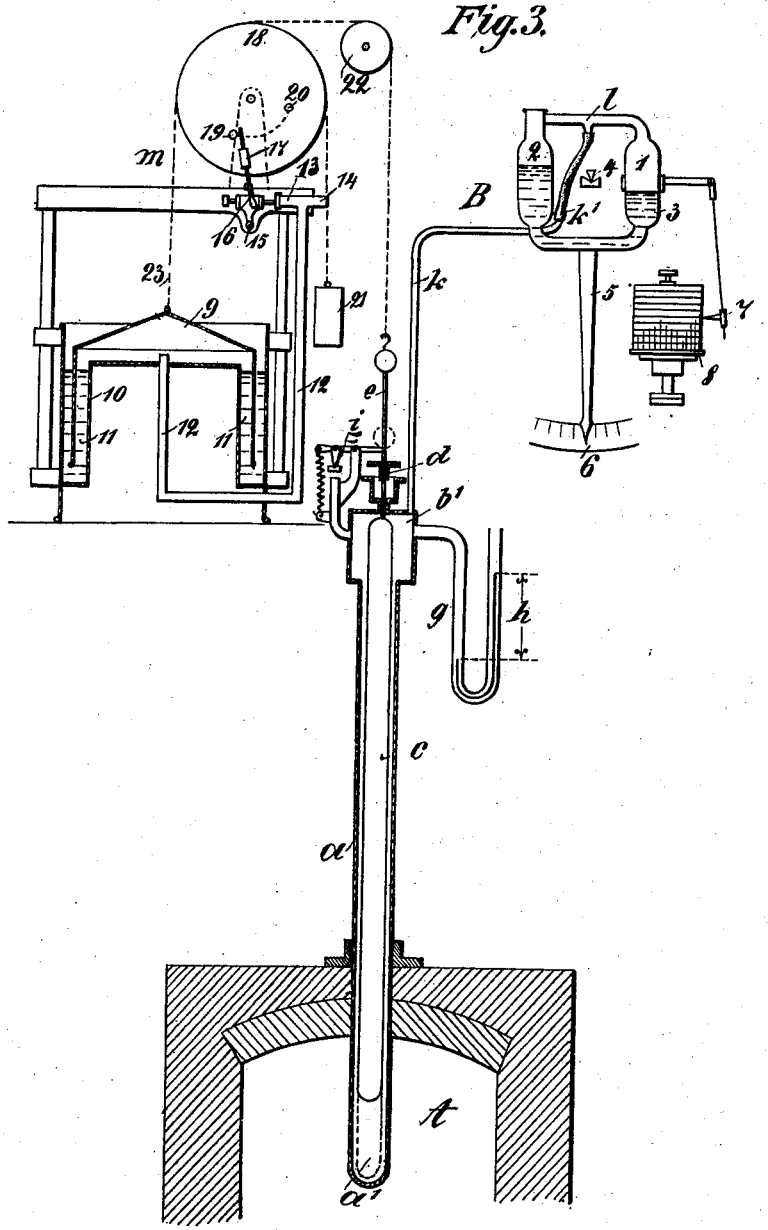

In the accompanying drawings, Figure 1 is a sectional view of my pyrometer inserted in a furnace-flue. Fig. 2 is a similar view of a modified form of the same. Fig. 3 shows the pyrometer combined with a motor driven from the chimney and with a pressure or expansion recording apparatus for showing the temperatures during a length of time.

In the furnace-flue A, the temperature within which is to be measured, is inserted a vessel $a$, filled with air and in communication with a chamber or enlargement $b$.

$c$ is a body held within the air vessel $a$ by a rod $e$, working air-tight in a stuffing-box $d$ and permitting said body to be moved from the outside. The chamber $b$ is in communication through a tube $g$ with a manometer $h$ and is furnished with a valve $i$, by which said chamber may be placed in communication with the outer air.

The pyrometer works as follows: At the time the pyrometer is not being used for measuring a temperature the body $c$ occupies its lowest position. The air-valve $i$ is open, and consequently there is atmospheric pressure in the vessel $a$ and manometer $h$, and the temperature of the air in the chamber $b$ is the same as that of the outer air. In order to measure a temperature, first of all the air-valve $i$ is closed, and then the body $c$ raised in the vessel $a$ and chamber $b$, whereupon a portion of the air is forced from the chamber $b$ to the bottom part $a'$ of the vessel $a$, where it is heated to the temperature present in the flue A, and this temperature extends so that within the pyrometer there is an air-pressure which is in a certain proportion to the flue temperature and which can be read off from the manometer. If now the body $c$ is again moved to its lowest position, it again forces the air from the heating-space $a'$ into the chamber $b$, and the air-valve is again opened to insure perfect equilibrium of pressure with the atmosphere.

In the modification shown in Fig. 2, in which like characters of reference indicate the same parts as in Fig. 1, the pyrometer is adapted to turn in the flue A, to which end the vessel $a$ is mounted on a joint $q$, provided in a casing $p$, which is fixed in the wall of said flue. A flexible tube $g'$ connects the chamber $b$ with the manometer $h$, and the air-valve $i$ is so arranged that in the position of the pyrometer shown in the drawings it will stand open, and when that end of the pyrometer is lowered it will close automatically. If now this outer end is moved downward either by hand from the handle $o$ or mechanically by means of a cord $s$, led over a pulley $r$, the body $c$ will fall by gravity into the chamber $b$, so that the increase of pressure in the pyrometer corresponding to the flue temperature can be read off from the manometer.

In the construction shown in Fig. 3 the pyrometer, for the purpose of indicating and recording measurements of temperature, is connected, through a small air-tube $k$ and flexible tube $k'$, with a container $l$, composed of two vessels 1 and 2, which are partly charged with liquid 3 and are in communication with one another. The container is carried on a knife-edge 4, on which it is adapted to oscillate according as the liquid rises and falls in the two vessels 1 and 2. To the container is attached a pointer 5, which in the oscillations of the container is moved over a scale 6. In jointed connection with the container is a rod carrying a marking-stud 7, which draws lines upon a rotating drum 8.

In order that the pyrometer may operate automatically, the body $c$ is connected with a small motor, Fig. 3. A receiver or bell 9 dips into a liquid 11, supplied to a vessel or small tank 10. The open end of a tube 12 reaches underneath the receiver 9, said tube being in communication with the chamber 13, and this latter, through tube 14, in communication (not shown) with the chimney. The chamber 13 can be placed in communication with the outer air by means of the valve 15, operated by a lever adapted to turn on a fixed point, which lever 17 is in the movements of the pulley 18 thrown to and fro by the studs 19 20, fixed therein. Passing over the pulley 18 is a cord 23, which at one end is attached to the receiver 9 and at the other end carries a weight 21. Further, another cord 23, which is attached to the pulley 18, passes over a pulley 22 and carries, through the rod $e$, the body $c$.

This apparatus works as follows: The chimney-draft produces a partial vacuum in the chamber 13, tube 12, and receiver 9 so long as the valve 15 remains closed. Thereby the receiver 9 descends, thus causing the pulley 18 to turn and therewith the body $c$ to rise. If now the valve 15 is opened, the partial vacuum in the receiver 9, tube 12, and chamber 13 will cease, being replaced by the pressure of the atmosphere, whereupon the receiver 9 rises and the body $c$ falls. In this way the body $c$ is raised and lowered at certain intervals, during which the temperature is measured by the container $l$ by reason of the variations of pressure or expansion of the air in the vessel $a$ being carried over through the tubes $k$ and $k'$ to the vessel 1, and thus causing differences of level of the liquid respectively in the vessels 1 and 2. These two containers 1 and 2 act as a balanced manometer, readily swinging on the knife-edge 4 when the liquid in 1 is displaced by the air-pressure into 2. When the liquid increases in quantity in the vessel 1, the container $l$ rocks toward the left and when increased in the vessel 2 toward the right.

What I claim as my invention, and desire to secure by Letters Patent, is—

1. A pyrometer comprising a closed vessel, a body movable in said vessel to displace air from one end into the other of said vessel, and a manometer connected to the vessel, substantially as described.

2. A pyrometer comprising a closed vessel, a body movable therein to displace air from one end to the other of said vessel, a manometer connected to the vessel and means for placing said vessel in communication with the atmosphere, substantially as set forth.

3. A pyrometer comprising a closed tubular vessel, a body movable therein to displace air from one end to the other of said vessel, a manometer connected to the upper end of said vessel and a valve arranged to admit air to one end thereof, substantially as described.

4. A pyrometer, comprising a closed tubular vessel, an air-chamber at one end thereof, a body therein arranged to displace air from said chamber to the bottom of the vessel and a manometer connected to said chamber, substantially as set forth.

5. A pyrometer comprising a closed tubular vessel, an air-chamber formed on the upper end thereof, a body in said vessel and chamber to displace air from one end to the other of the vessel, a valve to open the vessel and chamber to the atmosphere, a spring to weight the valve and a manometer connected to the chamber, substantially as described.

6. A pyrometer comprising a closed tubular vessel, an air-chamber formed on the upper end thereof, a body in said vessel and chamber, means exterior of both for moving said body from end to end therein, a manometer and a weighted valve connected to the chamber, substantially as set forth.

7. The combination with a closed tubular vessel, a body arranged to move therein and displace air from one end to the other thereof, of a manometer connected to the vessel and means operated by a chimney-draft to automatically move said body from end to end in the vessel, substantially as set forth.

8. The combination with a closed vessel and a body movable from end to end; of a tank, a bell liquid-sealed in said tank and normally held lifted by said body, means for automatically decreasing air-pressure below said bell to lift said body, and devices for automatically placing the bell in communication with the atmosphere, thereby causing a lowering of said body in the closed vessel, substantially as set forth.

9. The combination with a closed vessel and a body movable from end to end therein; of a tank, a pulley located over said tank, a bell liquid-sealed in the tank, flexibly connected to said body over the pulley and normally held lifted, an exhausting-tube connecting the interior of said bell with a chimney, a valve organized to open the exhausting-tube to the atmosphere and operated from said pulley, substantially as set forth.

10. The combination with a tubular vessel, a chamber formed on the end thereof, a body arranged to displace air from said chamber to the opposite end of the vessel; of a tank, a pulley located above said tank, a bell liquid-sealed in the tank and normally held lifted, a cord connecting said tank and body, lugs on the pulley, an exhausting-tube connected to a draft-flue and arranged to exhaust the interior of said bell, a valve to open the exhausting-tube to the atmosphere and a lever operated by said lugs and arranged to open and close said valve, substantially as set forth.

In testimony that I claim the foregoing as my invention I have signed my name in presence of two subscribing witnesses.

MAX ARNDT.

Witnesses:
E. M. BRUNDAGE,
L. BARNES.